(12) United States Patent
Boneberg et al.

(10) Patent No.: US 6,656,616 B2
(45) Date of Patent: Dec. 2, 2003

(54) FUEL CELL SYSTEM

(75) Inventors: Stefan Boneberg, Beuren (DE);
Michael Schonert, Stuttgart (DE);
Thomas Stark, Kirchheim/Teck (DE)

(73) Assignee: Ballard Power Systems AG,
Kirchheim/Tech-Nabern (DE)

( * ) Notice: Subject to any disclaimer, the term of this patent is extended or adjusted under 35 U.S.C. 154(b) by 130 days.

(21) Appl. No.: 09/820,330

(22) Filed: Mar. 29, 2001

(65) Prior Publication Data
US 2001/0053466 A1 Dec. 20, 2001

(30) Foreign Application Priority Data
Mar. 29, 2000 (DE) .......................... 100 15 652

(51) Int. Cl.[7] .......................... H01M 8/00; H01M 8/04; H01M 8/12
(52) U.S. Cl. .............................. 429/12; 429/22; 429/24
(58) Field of Search ........................ 429/12, 13, 17, 429/22, 23, 24, 25

(56) References Cited

U.S. PATENT DOCUMENTS

| | | | | |
|---|---|---|---|---|
| 5,084,363 A | * | 1/1992 | Reiser | 429/19 |
| 5,401,589 A | * | 3/1995 | Palmer et al. | 429/13 |
| 5,686,196 A | | 11/1997 | Singh et al. | 429/17 |
| 5,856,034 A | * | 1/1999 | Huppmann et al. | 429/17 |
| 6,086,839 A | * | 7/2000 | Autenrieth et al. | 423/350 |
| 6,383,468 B1 | * | 5/2002 | Schussler et al. | 423/651 |
| 6,472,092 B1 | * | 10/2002 | Matsuda et al. | 429/17 |

FOREIGN PATENT DOCUMENTS

DE  197 55 116 C1  12/1997

* cited by examiner

Primary Examiner—Randy Gulakowski
Assistant Examiner—Donald V. Scaltrito
(74) Attorney, Agent, or Firm—Crowell & Moring LLP

(57) ABSTRACT

In a fuel cell system having a fuel cell and a catalytic burner connected downstream thereof, an additional hydrogen-containing medium is fed to the catalytic burner.

14 Claims, 1 Drawing Sheet

FUEL CELL SYSTEM

This application claims the priority of German patent document 100 15 652.5, filed Mar. 29, 2000, the disclosure of which is expressly incorporated by reference herein.

BACKGROUND AND SUMMARY OF THE INVENTION

The invention relates to a fuel cell system having a fuel cell and a catalytic burner connected downstream therefrom, and a method for operating such a fuel cell system.

A fuel cell system and method of this type, with a downstream catalytic burner, are known, for example, from German patent document DE 197 55 116, in which the fuel cell is initially fed with a fuel-containing medium and an oxygen-containing medium. The fuel-containing medium used is generally a liquid or gaseous hydrocarbon compound, preferably a low-molecular-weight hydrocarbon compound, such as for example methanol, which can be obtained by reforming higher molecular weight compounds. The oxygen-containing medium used may, for example, be air.

After they have passed through the fuel cell and are discharged therefrom, the media are fed to a catalytic burner for combustion. The heat obtained during the combustion can be utilized in the fuel cell system or can be discharged for use in some other way.

One problem in such systems is that, during the start-up phase of each operating cycle of the fuel cell system, the catalyst of the catalytic burner is still cold, and exhibits a low activity. Consequently combustion is either insufficient, or does not take place at all, resulting in increased pollutant emissions and delayed response of the burner, associated with delayed emission of heat.

U.S. Pat. No. 5,686,196 discloses a hydrogen store for storing hydrogen which is generated during an operating cycle of the fuel cell system. This hydrogen is fed to the fuel-containing medium for de-sulphurization in particular during the start-up and stopping phase.

It is an object of the present invention to improve the start-up performance of a fuel cell system, particularly its catalytic burner, and to reduce its emissions.

This and other objects and advantages are achieved by the fuel cell system according to the invention, which includes a feed device for feeding an additional hydrogen-containing medium (which is more highly reactive than the media discharged from the fuel cell) to the catalytic burner at the start of an operating cycle of the fuel cell system. It should be noted in this regard that a catalytic burner is usually started up by means of hydrocarbons. As a result of the inventive feed of hydrogen, it is possible to pre-heat the catalyst in the catalytic burner to such an extent that these hydrocarbons can be reacted without any emissions. As a result, catalytic combustion is initiated even at the relatively low temperatures which prevail in the catalytic burner during the start-up phase, and which generally correspond to ambient temperature. Furthermore, during the combustion of the additional hydrogen-containing medium, there are far fewer undesirable emissions in the (still) cold catalytic burner than would be the case if hydrocarbons were being burnt. Therefore, a considerable contribution is made to environmental protection.

The reaction constituent used for the additional hydrogen-containing medium is an oxygen-containing medium, preferably air, which is fed in the usual way via the fuel cell. Alternatively, the fuel cell system may also have a separate feed device for feeding the oxygen-containing medium to the catalytic burner.

To achieve a favorable overall energy balance of the fuel cell system, the additional hydrogen-containing medium is supplied only in the start-up phase.

After combustion of the additional hydrogen-containing medium has provided sufficient heating of the catalytic burner, further heating can take place by the addition of a fuel-containing medium, such as for example methanol; therefore it is ultimately possible to switch to normal operation. In this phase, only a relatively small quantity of the additional hydrogen-containing medium (or none at all) is still required. Therefore, it is advantageous if the fuel cell system has a control unit which controls the feed device for the additional hydrogen-containing medium. In this way, the supplied quantity of additional hydrogen-containing medium can be adapted to prevailing conditions, and if appropriate can be stopped altogether. In this context, it should be noted that in normal operation the exhaust gas from the fuel cell anode (residual hydrogen) is reacted. If appropriate, it is possible to feed additional hydrocarbon, for example methanol, to the catalytic burner.

In bringing the catalytic burner to a desired temperature, the control device regulates the feed device (and therefore the feed of additional hydrogen-containing medium) as a function of the temperature of the catalytic burner. For this purpose, a temperature sensor may be arranged on the latter. If an arrangement of this type is not expedient, it is also possible to measure the temperature at other points in the fuel cell system where the temperature correlates with that of the catalytic burner. Finally, the control may also take place at low cost purely as a function of time, if the time required for the catalytic burner to reach the desired temperature is known with sufficient accuracy.

In order always to have a sufficient hydrogen-containing medium available, the fuel cell system has a store for additional hydrogen-containing medium, which is in communication with the feed device. The additional hydrogen-containing medium contains, for example, reformate, which may constitute a substantial portion thereof. Alternatively, or in addition, it may contain or consist of hydrogen obtained in a preceding operating cycle of the fuel cell system.

The additional hydrogen-containing medium can be passed from the feed device directly to the catalytic burner. However, it may also be advantageous to arrange a liquid separator in the feed device or between the feed device and the catalytic burner. As a result, if appropriate, condensate can be separated out. If the liquid separator is arranged between feed device and the catalytic burner, it is also possible to separate out condensate contained in the oxygen-containing medium which is supplied for combustion.

As a further start-up aid, a hot point may be arranged in the catalytic burner, locally or over a large area, in order to assure reliable starting of the reaction with hydrogen, even at low temperatures. For this purpose, a means for increasing the temperature of the catalytic burner locally or over a large area is situated on or in the catalytic burner. Alternatively, the additional hydrogen-containing medium or the oxygen-containing medium may also be heated.

The means for increasing the temperature is advantageously designed as an electrical heater means, e.g. as a spark plug.

Other objects, advantages and novel features of the present invention will become apparent from the following detailed description of the invention when considered in conjunction with the accompanying drawings.

BRIEF DESCRIPTION OF THE DRAWINGS

The single FIGURE depicts diagrammatically a fuel cell system, according to the invention.

DETAILED DESCRIPTION OF THE DRAWINGS

Figure 1:
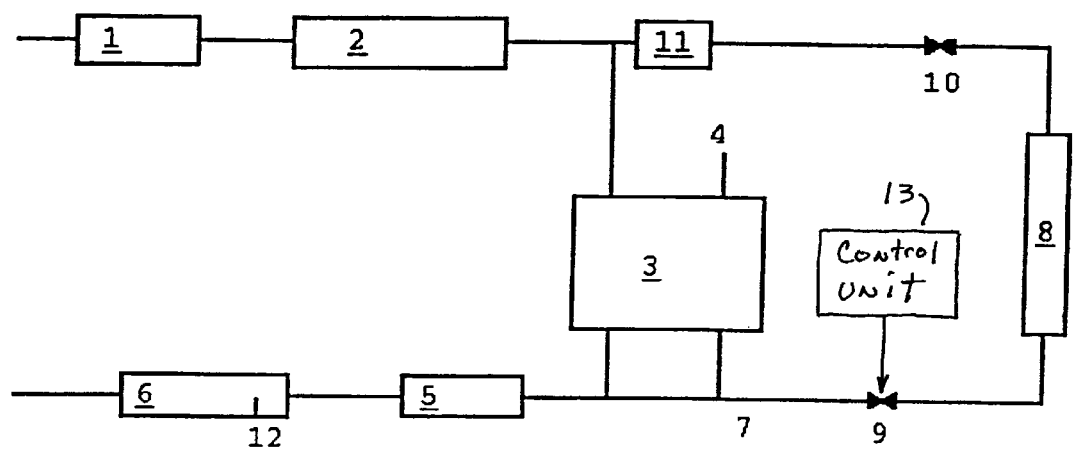

The fuel cell system has a reforming reactor 1 which contains a catalyst material that is suitable for catalyzing the steam reforming reaction (for example a copper/zinc oxide compound). An evaporator (not shown), in which water and methanol are fed from corresponding reservoirs by means of an appropriate metering device, may be connected upstream of the reforming reactor.

On account of process conditions, the hydrogen-rich reformate produced in the reforming reactor 1 contains a certain fraction of carbon monoxide and certain residual hydrocarbons. The carbon monoxide should be reduced to a lower level, in order to prevent losses in the fuel cell activity of the fuel cell system. Likewise, the level of certain residual hydrocarbons should be reduced to a predetermined level, since these residual hydrocarbons may have a more long-term and therefore more damaging effect on the fuel cell arrangement.

For this purpose, a gas-cleaning device 2, in which the carbon monoxide is removed, for example by selective oxidation or methanation, is connected downstream of the reforming reactor 1.

From the gas-cleaning device 2, the hydrogen-rich reformate is fed to the fuel cell 3 on the anode side as fuel-containing medium. The fuel cell is preferably designed as fuel cell stack. In addition, an oxygen-containing medium 4 (generally outside air which has been compressed by a compressor) is fed to the fuel cell 3 on the cathode side. The media which are formed during the reaction in the fuel cell 3 are discharged from the fuel cell 3 as cathode and anode exhaust gases, and combined. They are freed of condensate in a liquid separator 5, and finally fed to a catalytic burner 6 connected downstream of the fuel cell.

According to the invention, the fuel cell system has a feed device 7 for feeding an additional hydrogen-containing medium to the catalytic burner 6. Via this device, an additional hydrogen-containing medium can be fed to the fuel cell system between the fuel cell 3 and the catalytic burner 6. In the simplest case, the feed device 7 is a pipe or line which opens into a connecting line between fuel cell 3 and catalytic burner 6. The feed of additional hydrogen-containing medium is regulated by means of a control device, comprising a valve 9 and an electronic control unit 13.

In the start-up phase of an operating cycle, air 4 is fed via the fuel cell 3 and the additional hydrogen-containing medium is fed via the feed device 7, to the catalytic burner 6 connected downstream of the fuel cell 3. This leads to a temperature increase in the catalytic burner, which is then heated further in a second phase as a result of the addition of a fuel-containing medium, preferably methanol. As a result of the elevated temperatures in the catalytic burner 6 the methanol can be converted with lower emission levels.

The additional hydrogen-containing medium is taken from a store 8 which is in communication with the feed device 7.

If the additional hydrogen-containing medium is reformate (i.e. hydrogen which has been obtained in particular during a preceding operating cycle), the store is connected to an output of the gas-cleaning device 2 via a valve 10. Alternatively, the store may also be connected to the fuel cell system between reforming reactor 1 and gas-cleaning device 2, since the catalytic burner 6 is less sensitive to carbon monoxide and certain residual hydrocarbons than the fuel cell 3.

If hydrogen obtained in a preceding operating cycle is used as the additional hydrogen-containing medium, a hydrogen separation device 11 is advantageously arranged between the gas-cleaning device 2 and the store 8. This device contains a membrane which is selectively permeable to hydrogen. As soon as the reformate enters the hydrogen separation device 11, some of the hydrogen contained therein, with the assistance of a reduced pressure on the other side of the membrane, passes through the membrane and is fed to the store 8. The latter is then preferably designed as a metal hydride store. There, the hydrogen for the start-up phase of the next operating cycle can be stored and then, according to the invention, used for pre-heating of the catalytic burner 6.

To further improve start-up performance, a means 12 for increasing the temperature of the catalytic burner (for example a spark plug) may be arranged in the catalytic burner.

All the embodiments of the invention are based on the common idea of increasing the reactivity in the catalytic burner when the latter is still cold in the start-up phase, and thus of contributing to an improved start-up performance of the fuel cell system and to relieving environmental pollution.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell system comprising:
   at least one fuel cell;
   at least one catalytic burner connected downstream of the fuel cell and coupled to receive media which have been discharged from the fuel cell; and
   a feed device for feeding an additional hydrogen-containing medium to the catalytic burner during a start-up phase of the fuel cell system.

2. The fuel cell system according to claim 1, further comprising a control device, which controls the feed device for the additional hydrogen-containing medium.

3. The fuel cell system according to claim 2, wherein the feed device is controlled by the control device as a function of one of time, and temperature of the catalytic burner.

4. The fuel cell system according to claim 1, further comprising a store for the additional hydrogen-containing medium, which store is in communication with the feed device for the additional hydrogen-containing medium.

5. The fuel cell system according to claim 1, wherein the additional hydrogen-containing medium contains reformate.

6. The fuel cell system according to claim 1, wherein the additional hydrogen-containing medium contains hydrogen obtained in an operating cycle of the fuel cell system preceding said start-up phase.

7. A fuel cell system comprising:
   at least one fuel cell;
   at least one catalytic burner connected downstream of the fuel cell and coupled to receive media which have been discharged from the fuel cell; and
   a feed device for feeding an additional hydrogen-containing medium to the catalytic burner; and
   a liquid separator, arranged between the feed device and the catalytic burner.

8. A fuel cell system comprising:
   at least one fuel cell;
   at least one catalytic burner connected downstream of the fuel cell and coupled to receive media which have been discharged from the fuel cell; and a feed device for feeding an additional hydrogen-containing medium to the catalytic burner; and means for increasing the temperature of the catalytic burner, arranged in the catalytic burner.

9. The fuel cell system according to claim 8, wherein the means for increasing the temperature of the catalytic burner is a spark plug.

10. A method for operating a fuel cell system having at least one fuel cell, and at least one catalytic burner which is connected downstream of the fuel cell, and is coupled to receive media which have been discharged from the fuel cell, said method comprising:

feeding an additional hydrogen-containing medium to the catalytic burner;

wherein the additional hydrogen-containing medium is fed during a start-up phase of the fuel cell system.

11. A fuel cell system comprising:

a fuel cell;

a catalytic burner coupled to receive a hydrogen containing media flow output from said fuel cell;

a feed device for injecting an additional hydrogen containing medium into said catalytic burner; and a control unit for controlling an amount of said additional hydrogen containing medium injected by said feed device, as a function of one of a temperature of said catalytic burner, and time.

12. The fuel cell according to claim 11, wherein said feed device comprises:

a storage device for storing said additional hydrogen containing medium;

a conduit connecting said storage device to said catalytic burner; and a valve controlled by said control unit, for regulating a flow of said additional hydrogen containing medium into said catalytic burner.

13. The fuel cell system according to claim 12, wherein the additional hydrogen-containing medium contains reformate.

14. The fuel cell system according to claim 12, wherein the additional hydrogen-containing medium contains hydrogen obtained in a preceding operating cycle of the fuel cell system.

* * * * *